(No Model.)

B. BARRY.
CHEESE CUTTER.

No. 400,537. Patented Apr. 2, 1889.

WITNESSES:
Fred G. Dieterich
Amos W. Hart

INVENTOR:
BERNARD BARRY.
BY Munn & Co
ATTORNEYS.

UNITED STATES PATENT OFFICE.

BERNARD BARRY, OF SCHENECTADY, NEW YORK.

CHEESE-CUTTER.

SPECIFICATION forming part of Letters Patent No. 400,537, dated April 2, 1889.

Application filed November 13, 1888. Serial No. 290,761. (No model.)

*To all whom it may concern:*

Be it known that I, BERNARD BARRY, of Schenectady, Schenectady county, and State of New York, have invented a new and useful Improved Cheese-Knife, of which the following is a full, clear, and exact description.

The object of my invention is to provide a knife adapted to cut wedge-shaped slices from the body of a cheese by one movement of the same.

The body of the knife is formed of a thin flat plate, one of whose ends is beveled to serve as a straight cutting-edge. One of the longer side edges of this plate (in practical use the lower) is extended laterally at a right angle and provided with an oblique cutting-edge. In other words, the main plate is provided at its base or lower edge with a triangular flange, which serves as a horizontal cutter.

Figure 1:
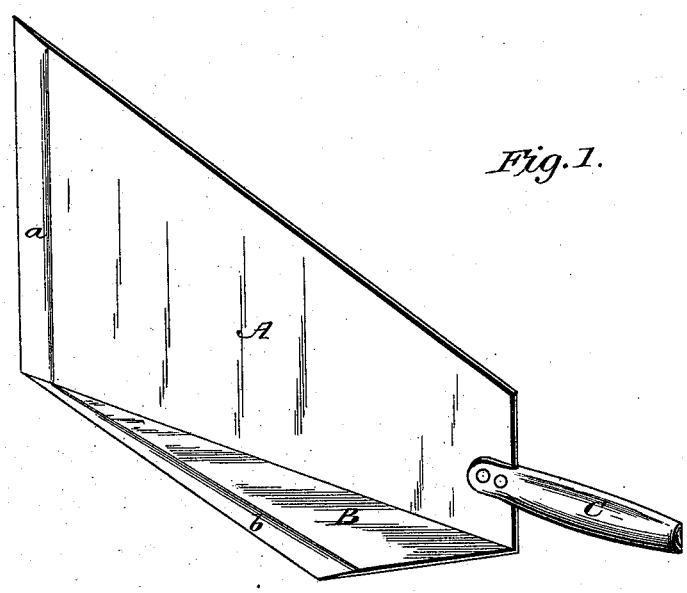
Figure 2:
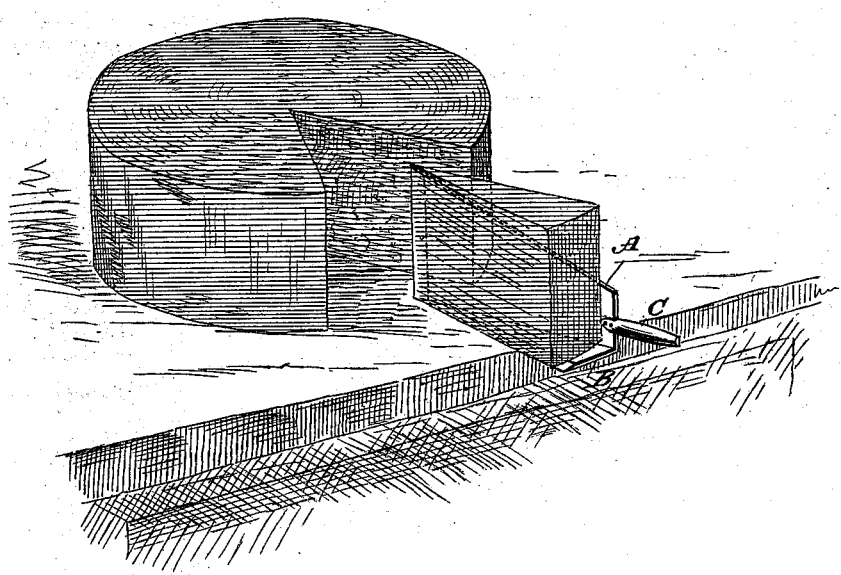

In accompanying drawings, Figure 1 is a perspective view of the knife, and Fig. 2 is a perspective view illustrating the practical use of the same.

The main plate or body A of the knife is a thin flat blade, one end, $a$, being beveled, thus forming a straight cutting-edge, which in practice makes the vertical cut required for severing a slice from a cheese. The lower side edge of this plate A is extended laterally, thus forming a horizontal flange, B, whose edge $b$ is oblique and beveled to adapt it to serve as a cutter. In other words, the part B is a cutter of triangular shape arranged at a right angle to the main plate or cutter A, its edge $b$ inclining toward and meeting the edge $a$ of the latter, as best shown in Fig. 1. A suitable handle, C, is permanently attached to the body A.

In practical use of this knife (see Fig. 2) it is held in horizontal position with the edge $a$ of the main cutter A vertical, and the latter is forced into the side of the cheese toward the center of the same. Thus the edge $a$ makes a vertical cut, and the edge $b$ of the triangular cutter passes beneath the cheese or else makes a horizontal cut therein, as the case may be. The wedge-shaped slice thus severed rests on the base-cutter B, and the knife may be used as an implement for lifting and transferring it to a plate or dish.

What I claim is—

As an article of manufacture, the improved cheese-knife formed of the triangular base-flange B, having its outer edge sharpened, and the body or main plate A, provided with the aligned handle C and arranged at right angles to the said flange, its sharpened front edge being vertical and meeting the apex of the flange, as shown and described.

BERNARD BARRY.

Witnesses:
W. W. WEMPLE,
DANIEL NAYLOR, Jr.